United States Patent
Kamemura et al.

(10) Patent No.: US 9,644,743 B2
(45) Date of Patent: May 9, 2017

(54) SEALING DEVICE

(71) Applicant: NOK Corporation, Tokyo (JP)

(72) Inventors: Makoto Kamemura, Fukushima (JP);
Hiroki Matsui, Fukushima (JP);
Hideharu Hyakutake, Fukushima (JP);
Tomoaki Nishimura, Fukushima (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 15/019,121

(22) Filed: Feb. 9, 2016

(65) Prior Publication Data
US 2016/0161002 A1 Jun. 9, 2016

Related U.S. Application Data

(63) Continuation of application No. 14/356,048, filed as application No. PCT/JP2012/081998 on Dec. 11, 2012.

(30) Foreign Application Priority Data

Apr. 27, 2012 (JP) ................................. 2012-102102

(51) Int. Cl.
*F16J 15/32* (2016.01)
*F16J 15/3244* (2016.01)
(Continued)

(52) U.S. Cl.
CPC ............ *F16J 15/3244* (2013.01); *F16J 15/16* (2013.01); *F16J 15/3204* (2013.01)

(58) Field of Classification Search
CPC ...... F16J 15/32; F16J 15/3244; F16J 15/3204; F16J 15/46
(Continued)

(56) References Cited

U.S. PATENT DOCUMENTS 3,534,969 A 10/1970 Weinand
4,174,845 A * 11/1979 Hadaway ............. F16J 15/3244
277/559
(Continued)

FOREIGN PATENT DOCUMENTS

CN 1639489 A 7/2005
EP 0939257 A2 9/1999
(Continued)

OTHER PUBLICATIONS

Extended European Search Report for Application No. EP 12 87 5052 dated Jul. 2, 2015 (3 pages).
(Continued)

*Primary Examiner* — Kristina Fulton
*Assistant Examiner* — Eugene G Byrd
(74) *Attorney, Agent, or Firm* — Harness, Dickey & Pierce, P.L.C.

(57) ABSTRACT

The invention provides a sealing device which can inhibit an external dust in an atmospheric side from intruding into a lip end, thereby inhibiting a sealing fluid leakage by trapped dust. In a sealing device inhibiting leakage of a sealing fluid in an inboard side to an atmospheric side, coming into contact with a shaft by a seal lip end and circumferentially having in an atmospheric side inclined surface of the seal lip with a plurality of screws exerting a pumping action to the sealing fluid, a three-dimensional shape for preventing the dust intrusion is provided between the screws so as to inhibit the external dust intrusion in the atmospheric side toward the lip end. The three-dimensional shape is constructed by a projection or a groove extending in a parallel direction to the lip end. The projection or the groove is connected to the screws longitudinally in both end portions.

4 Claims, 7 Drawing Sheets

(51) Int. Cl.
*F16J 15/16* (2006.01)
*F16J 15/3204* (2016.01)

(58) Field of Classification Search
USPC .......................................... 277/559, 569, 560
See application file for complete search history.

(56) References Cited

U.S. PATENT DOCUMENTS

| | | | |
|---|---|---|---|
| 5,915,696 A * | 6/1999 | Onuma | F16J 15/328 |
| | | | 277/559 |
| 6,726,211 B1 | 4/2004 | Kuroki et al. | |
| 2009/0200750 A1 * | 8/2009 | Takeno | F16J 15/324 |
| | | | 277/569 |
| 2010/0109252 A1 * | 5/2010 | Matsui | F16J 15/3244 |
| | | | 277/559 |
| 2011/0095486 A1 * | 4/2011 | Nakagawa | F16J 15/324 |
| | | | 277/549 |

FOREIGN PATENT DOCUMENTS

| | | |
|---|---|---|
| JP | S55-47050 A | 4/1980 |
| JP | 07-208611 A | 8/1995 |
| JP | 2000-081149 A | 3/2000 |
| JP | 2001-027326 A | 1/2001 |
| JP | 2001-295942 A | 10/2001 |
| JP | 03-278349 B2 | 4/2002 |
| JP | 2004-068889 A | 3/2004 |

OTHER PUBLICATIONS

Chinese Search Report for Application No. 2012-800544654 dated Aug. 18, 2015 (1 page).

* cited by examiner

SEALING DEVICE

CROSS-REFERENCE TO RELATED APPLICATIONS

This application is a Continuation application of U.S. application Ser. No. 14/356,048 filed May 2, 2014, which claims priority to U.S. National Stage International Application No. PCT/JP2012/081998 filed on Dec. 11, 2012, and published in Japanese as WO 2013/161120 A1 on Oct. 31, 2013. This application claims priority to Japanese Application No. 2012-102102 filed on Apr. 27, 2012. The disclosures of the above applications are incorporated herein by reference.

BACKGROUND OF THE INVENTION

Field of the Invention

The present invention relates to a sealing device according to a seal technology. The sealing device according to the present invention is used, for example, in an automobile related field or a general purpose machine field.

Description of the Conventional Art

Figure 7:
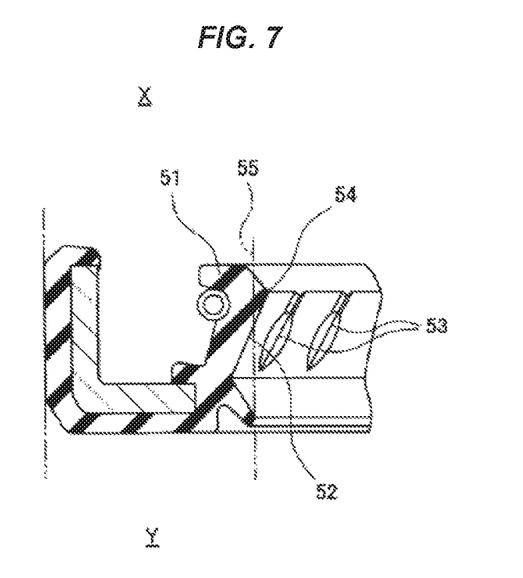
FIG. 7 is a cross sectional view of a substantial part of a sealing device according to a prior art.

Conventionally, as shown in FIG. 7, for the purpose of increasing a pump amount of a seal lip 51, there has been known a sealing device provided in an atmospheric side inclined surface 52 of the seal lip 51 with a screw 53 which exerts a pumping action in relation to a sealing fluid.

However, in the sealing device with the screw 53 as mentioned above, in the case that an external dust in an atmospheric side Y intrudes in the screw 53, the intruding dust turns according to a rotation of a rotating shaft 55 so as to move in a circumferential direction, the moving dust comes into contact with the screw 53, and the contact dust moves toward a lip end 54 along the screw 53. As a result, the dust is trapped between the lip end 54 and the shaft 55, a gap is generated between the lip end 54 and the shaft 55, and there is fear of a problem that the sealing fluid (an oil or the like) leaks from the gap.

SUMMARY OF THE INVENTION

Problem to be Solved by the Invention

The present invention is made by taking the above point into consideration, and an object of the present invention is to provide a sealing device which can inhibit an external dust in an atmospheric side from intruding into a lip end, whereby it is possible to inhibit a sealing fluid from leaking by a trapped dust.

Means for Solving the Problem

In order to achieve the object mentioned above, a sealing device according to a second aspect of the present invention is a sealing device inhibiting a sealing fluid in an inboard side from leaking to an atmospheric side, the sealing device coming into contact with a shaft by a lip end of a seal lip and being circumferentially provided in an atmospheric side inclined surface of the seal lip with a plurality of screws which exert a pumping action in relation to the sealing fluid, wherein a three-dimensional shape for preventing the dust from intruding is provided between the screws so as to inhibit the external dust in the atmospheric side from intruding toward the lip end, the three-dimensional shape is constructed by a projection or a groove which extends in a parallel direction to the lip end, and the projection or the groove is connected to the screws in each of both end portions in a longitudinal direction, the projection is formed approximately as a triangular shape having an apex coming close to the atmospheric side in its cross section, and the groove is formed approximately as a triangular shape having a bottom point coming close to a lip end side in its cross section.

Further, a sealing device according to a third aspect of the present invention is a sealing device inhibiting a sealing fluid in an inboard side from leaking to an atmospheric side, the sealing device coming into contact with a shaft by a lip end of a seal lip and being circumferentially provided in an atmospheric side inclined surface of the seal lip with a plurality of screws which exert a pumping action in relation to the sealing fluid, wherein a three-dimensional shape for preventing the dust from intruding is provided between the screws so as to inhibit the external dust in the atmospheric side from intruding toward the lip end, the three-dimensional shape is constructed by a projection or a groove which extends in a parallel direction to the lip end, and the projection or the groove is connected to the screws in each of both end portions in a longitudinal direction, the projection is formed approximately as a triangular shape or a quadrangular shape in its cross section, and a surface in the atmospheric side of the projection is set to an angular range which is perpendicular to the shaft or perpendicular to the atmospheric side inclined surface, the groove is formed approximately as a triangular shape or a quadrangular shape in its cross section, and a surface in the lip end side of the groove is set to an angular range which is perpendicular to the shaft or perpendicular to the atmospheric side inclined surface.

Further, a sealing device according to a fourth aspect of the present invention is the sealing device described in the second or third aspect mentioned above, wherein each of the screws is constructed by a parallel screw which is provided in the vicinity of the lip end and is uniform in its cross section, and a bilge-shaped screw which is provided continuously from the parallel screw, the three-dimensional shape is constructed by a first three-dimensional shaped projection which is provided so as to be connected to a connection portion between the parallel screw and the bilge-shaped screw or the parallel screw, and a second three-dimensional shaped projection which is provided continuously in the bilge-shaped screw, and a relationship h5<h3≤h6<h4 is satisfied, in which h3 is a height of the parallel screw, h4 is a maximum height of the bilge-shaped screw, h5 is a height of the first three-dimensional shaped projection, and h6 is a height of the second three-dimensional shaped projection.

In the sealing device according to the present invention provided with the structure mentioned above, since the three-dimensional shape for preventing the dust from intruding is provided between the adjacent screws so as to inhibit the external dust in the atmospheric side from intruding toward the lip end, the three-dimensional shape exerts a function of inhibiting the dust in the atmospheric side from intruding toward the lip end. Since the three-dimensional shape is constructed by the projection or the groove which extends in the parallel direction to the lip end, the projection dams the dust and the groove accommodates the dust, it is possible to inhibit the dust from intruding toward the lip end in any case. Since the projection or the groove is connected to the screws in each of both end portions in the longitudinal direction, the dust does not pass through the portion between the projection or the groove and the screw.

In the case that the three-dimensional shape is constructed by the projection, the cross sectional shape of the projection is not particularly limited, however, is formed, for example, approximately as the triangular cross sectional shape. In this case, the triangular shape may be a regular triangular shape or an isosceles triangular shape. However, in the case of a scalene triangular shape in which an apex comes closer to the atmospheric side, since an elevation angle of a surface in the atmospheric side is set to be large, the dust is hard to climb over the surface in the atmospheric side.

Further, the cross sectional shape of the projection may be formed approximately as the triangular cross sectional shape or the quadrangular cross sectional shape and the surface in the atmospheric side of the projection may be set within the angular range which is perpendicular to the shaft or perpendicular to the atmospheric side inclined surface. In this case, since the elevation angle of the surface in the atmospheric side is set to be large, the dust is hard to climb over the surface in the atmospheric side.

In the case that the three-dimensional shape is constructed by the groove, the cross sectional shape of the groove is not particularly limited, however, is formed, for example, approximately as the triangular cross sectional shape. The triangular shape may be a regular triangular shape or an isosceles triangular shape. However, in the case of a scalene triangular shape in which a bottom point comes closer to the lip end side, since an angle of dip of a surface in the lip end side is set to be large, the dust is hard to climb over the surface in the lip end side.

Further, the cross sectional shape of the groove may be formed approximately as the triangular cross sectional shape or the quadrangular cross sectional shape and the surface in the lip end side of the groove may be set within the angular range which is perpendicular to the shaft or perpendicular to the atmospheric side inclined surface. In this case, since the angle of dip of the surface in the lip end side is set to be large, the dust is hard to climb over the surface in the lip end side.

The screw is formed as a spiral projection, however, is constructed, for example, by the parallel screw which is provided in the vicinity of the lip end and has the uniform cross section, and the bilge-shaped screw which is provided continuously from the parallel screw. Further, the three-dimensional shape is constructed by the first three-dimensional shaped projection which is provided so as to be connected to the connection portion between the parallel screw and the bilge-shaped screw or the parallel screw, and the second three-dimensional shaped projection which is provided continuously in the bilge-shaped screw. In this case, if the relationship $h5 < h3 \leq h6 < h4$ . . . expression (a) is satisfied, in which h3 is the height of the parallel screw, h4 is the maximum height of the bilge-shaped screw, h5 is the height of the first three-dimensional shaped projection, and h6 is the height of the second three-dimensional shaped projection, the screw is higher than the projection in the corresponding positional relationship. Therefore, it is possible to sufficiently maintain the pumping action by the screw. The bilge-shaped screw is the largest its height and width in the center portion in the longitudinal direction, and is formed as a shape which is contracted little by little toward both ends.

Effect of the Invention

The present invention achieves the following effects.

More specifically, as mentioned above in the present invention, since the three-dimensional shape for preventing the dust intrusion is provided between the screws in order to inhibit the dust in the atmospheric side from intruding toward the lip end, the three-dimensional shape exerts the function of inhibiting the dust in the atmospheric side from intruding toward the lip end. Since the three-dimensional shape constructed by the projection dams the dust and the three-dimensional shape constructed by the groove accommodates the dust, the three-dimensional shape inhibits the dust from intruding toward the lip end in any case. Since the projection or the grove is connected to the screw in its end portion in the longitudinal direction, the dust does not pass through the portion between them and the screw. Therefore, on the basis of the above matters, it is possible to provide the sealing device which inhibits the dust in the atmospheric side from intruding toward the lip end, thereby inhibiting the sealing fluid from leaking due to the trapped dust, according to the desired purpose of the present invention.

Further, in the case that the projection of the three-dimensional shape is formed approximately as the triangular cross sectional shape in which the apex comes closer to the atmospheric side, it is possible to make the dust hard to climb over the surface in the atmospheric side of the projection. Further, in the case that the groove of the three-dimensional shape is formed approximately as the triangular cross sectional shape in which the bottom point comes closer to the lip end side, it is possible to make the dust hard to climb over the surface in the lip end side of the groove.

Further, in the case that the projection of the three-dimensional shape is formed approximately as the triangular cross sectional shape or the quadrangular cross sectional shape and the surface in the atmospheric side of the projection is set to the angular range which is perpendicular to the shaft or perpendicular to the atmospheric side inclined surface, it is possible to make the dust hard to climb over the surface in the atmospheric side of the projection. Further, in the case that the groove of the three-dimensional shape is formed approximately as the triangular cross sectional shape or the quadrangular cross sectional shape and the surface in the lip end side of the groove is set to the angular range which is perpendicular to the shaft or perpendicular to the atmospheric side inclined surface, it is possible to make the dust hard to climb over the surface in the lip end side of the groove.

Further, in the case of setting the height of each of the parallel screw, the bilge-shaped screw, the projection of the first three-dimensional shape and the projection of the second three-dimensional shape according to the expression (a) mentioned above, it is possible to make the exertion of the pumping action by the screw compatible with the inhibition of the dust intrusion by the projection.

BRIEF EXPLANATION OF THE DRAWINGS

FIGS. 3A and 3B are views showing a sealing device according to a second embodiment of the present invention, in which

FIGS. 4A and 4B are views showing a sealing device according to a third embodiment of the present invention, in which

DETAILED DESCRIPTION OF PREFERRED EMBODIMENTS

The following embodiments are included in the present invention.
(1) Structure
(1-1) A plurality of screws are peripherally formed in an atmospheric side inclined surface from the vicinity of a sealing surface of a main lip with a rotating shaft.
(1-2) A screw shape changes from a parallel screw which is uniform in its cross section in the vicinity of the sealing surface to a bilge-shaped screw toward the atmospheric side.
(1-3) An annular dam which is parallel to the sealing surface is provided so as to intersect a position of the parallel screw, a position at which the screw shape changes, or a position of the bilge-shaped screw.
(1-4) The dam is formed approximately as a triangular cross sectional shape in which an apex comes closer to the atmospheric side, and has a height which is lower than the screw.
(1-5) The damp is constructed by a projection, however, may be constructed by a groove. A dust collecting effect can be expected even by the groove.
(2) Effect
(2-1) It is possible to dam the dust intruding from the atmospheric side by the dam and prevent the dust from coming close to the sealing surface side.
(2-2) Since the apex of the dam is formed approximately as the triangular cross sectional shape coming closer to the atmospheric side, the dust is hard to climb over the dam.
(2-3) Since the height of the dam is lower than the screw, the dust is hard to come close to the leading end of the main lip while maintaining the pumping amount.
(2-4) In the case that the dam is provided in the bilge-shaped screw portion, the gap in relation to the shaft becomes larger, however, the effect of the dam can be maintained by increasing the height of the dam within the height of the bilge-shaped screw. Further, the effect of preventing the dust from coming close to the sealing surface side is enhanced by setting a plurality of dams in the atmospheric side form the oil side.

Embodiments

Next, a description will be given of embodiments according to the present invention with reference to the accompanying drawings.

Figure 1:
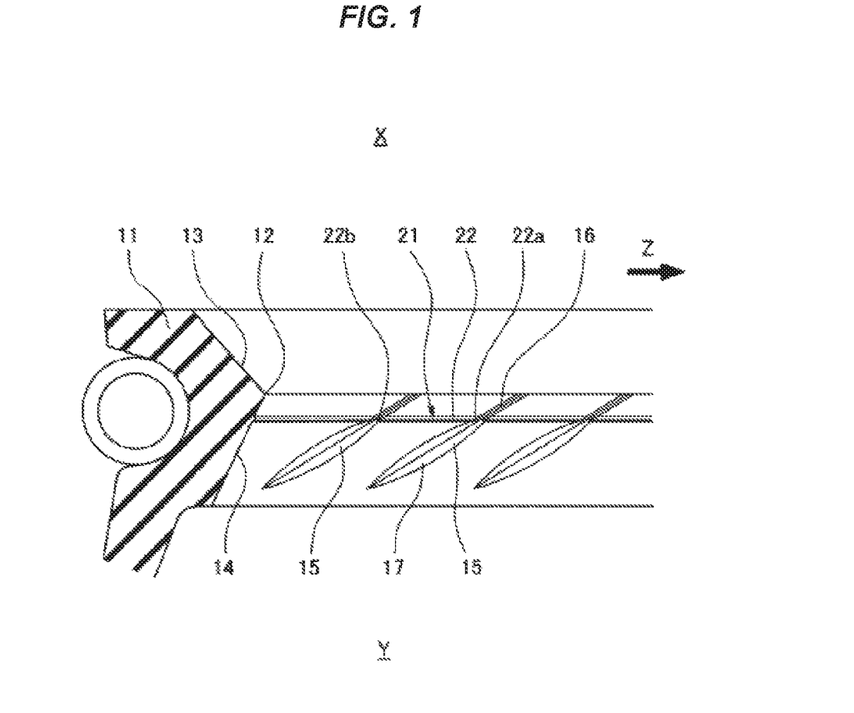
FIG. 1 is a cross sectional view of a substantial part of a sealing device according to a first embodiment of the present invention.
Figure 2A:
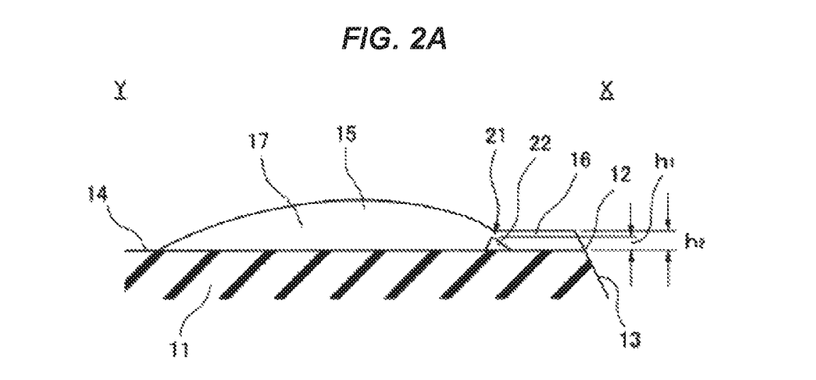
FIG. 2A is an explanatory view of a screw and a three-dimensional shape in the sealing device.
Figure 2B:
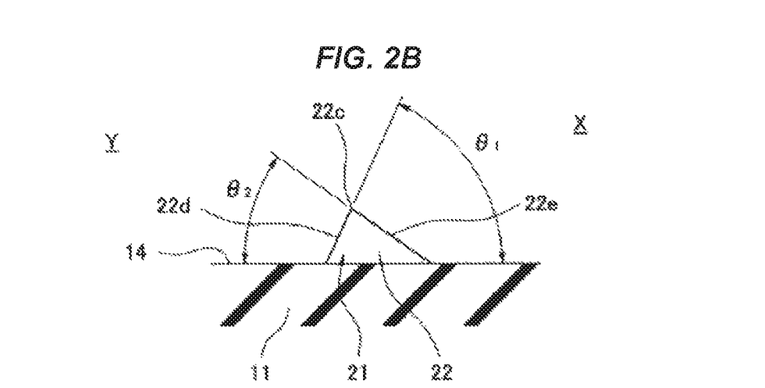
FIG. 2B is an explanatory view of the three-dimensional shape.

FIGS. 1 and 2 show a sealing device according to a first embodiment of the present invention. The sealing device according to the embodiment inhibits a sealing fluid (not shown) in an inboard side X from leaking to an atmospheric side Y by being installed to an inner peripheral surface of a shaft hole of an instrument (not shown) and slidably bringing a seal lip 11 into close contact with a peripheral surface of a shaft (not shown). The shaft turns in a direction of an arrow Z. The sealing device may be called as a rotating oil seal according to its function or its intended use.

The seal lip 11 is structured such as to slidably come into close contact with the peripheral surface of the shaft with its lip end 12, is provided in the inboard side X of the lip end 12 with an inboard side inclined surface 13, and is provided in the atmospheric side Y of the lip end 12 with an atmospheric side inclined surface 14. Further, the latter atmospheric side inclined surface 14 is provided circumferentially with a plurality of screws 15 for exerting a pumping action in relation to the sealing fluid at the shaft rotating time so as to push back the sealing fluid to the inboard side X.

The screw 15 is a spirally provided projection and is formed by a combination of a parallel screw 16 which is provided so as to reach the lip end 12 and is uniform in its cross section, and a bilge-shaped screw 17 which is provided continuously from the parallel screw 16. The screw 15 is formed so as to be inclined toward a rear side in the shaft rotating direction Z from a base end portion in a lip end side thereof to a leading end portion in the atmospheric side Y. The parallel screw 16 is constructed, for example, by a projection which is approximately formed as a triangular cross sectional shape, and is formed as a uniform shape over an entire length in its cross sectional shape. The bilge-shaped screw 17 is constructed, for example, by a projection which is approximately formed as a triangular cross sectional shape, and is formed as such a shape that a height and a width are the largest in the center portion in the longitudinal direction and are contracted little by little toward both end portions. In FIG. 1, as a matter of convenience for drawing, only three screws 15 are drawn, however, a lot of screws 15 are provided over a whole periphery.

Further, in the sealing device according to the embodiment, the following structure is provided so as to prevent the external dust (not shown) in the atmospheric side Y from intruding toward the lip end 12. The dust is constructed, for example, by a sand particle included in a muddy water.

In other words, on the atmospheric side inclined surface 14 of the seal lip 11, a three-dimensional shape 21 for preventing the dust intrusion is provided between the adjacent screws 15 so as to prevent the external dust in the atmospheric side Y from intruding toward the lip end 12 via a gap portion between the adjacent screws 15.

The three-dimensional shape 21 is constructed by a linear projection 22 which extends in a parallel direction to the lip end 12, that is, a circumferential direction, and both end portions 22a and 22b in a longitudinal direction of the projection 22 are connected a connection portion between the parallel screw 16 and the bilge-shaped screw 17 in the screw 15.

A cross sectional shape of the projection 22 is not particularly limited, however, is formed approximately as a triangular cross sectional shape as shown in FIG. 2 in the embodiment. The triangle is formed as a scalene triangular shape in which its apex 22c is closer to the atmospheric side Y, and an elevation angle $\theta 1$ of a surface 22d in the atmospheric side is set to be larger than an elevation angle $\theta 2$ of a surface 22e in the lip end side ($\theta 1 > \theta 2$). Further, a height h2 of the projection 22 is set to be somewhat smaller than a height h2 of the parallel screw 16 to which the projection 22 is coupled (h1<h2). The projection 22 can be also called as a dam on the basis of its exerting function.

In the sealing device having the structure mentioned above, since the three-dimensional shape 21 for preventing the dust intrusion is provided between the adjacent screws 15 so as to inhibit the external dust in the atmospheric side Y from intruding toward the lip end 12, the three-dimensional shape 21 exerts the function of inhibiting the dust in the atmospheric side Y from intruding toward the lip end 12. Since the three-dimensional shape 21 is constructed by the projection 22 which extends in the parallel direction to the lip end 12, and the projection 22 dams the dust, the dust is inhibited from intruding toward the lip end 12. Since the projection 22 is connected its both end portions 22a and 22b in the longitudinal direction to the screw 15, the dust does not pass through the portion between the projection 22 and the screw 15. Since the projection 22 is formed approximately as the triangular cross sectional shape and the elevation angle θ1 of the surface 22d in the atmospheric side is set to be large, the dust is hard to climb over the surface 22d in the atmospheric side. Therefore, according to the above matter, it is possible to inhibit the dust in the atmospheric side Y from intruding toward the lip end 12, whereby it is possible to inhibit the leakage of the sealing fluid due to the trapped dust.

Further, since the height h1 of the projection 22 is set to be smaller than the height h2 of the parallel screw 16 which is provided at the corresponding position, the projection 22 does not inhibit the pumping action by the screw 15. Accordingly, even in the case that the projection 22 for preventing the dust intrusion is provided, the pumping action by the screw 15 is sufficiently exerted.

The sealing device according to the first embodiment may be structured as follows.

Figure 3A:
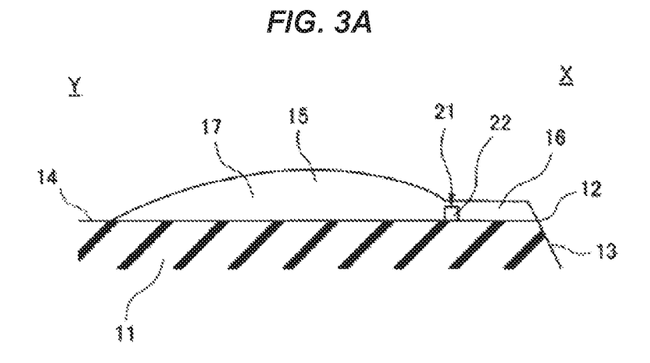
FIG. 3A is an explanatory view of a screw and a three-dimensional shape in the sealing device.
Figure 3B:
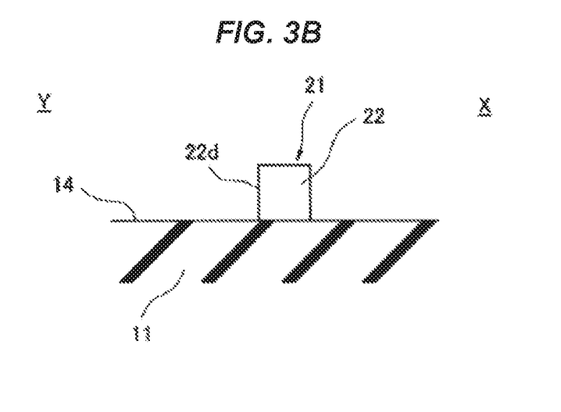
FIG. 3B is an explanatory view of the three-dimensional shape.

(i) In the first embodiment mentioned above, the projection 22 is formed approximately as the triangular cross sectional shape, however, the projection 22 may be alternatively formed approximately as a quadrangular cross sectional shape. A rectangular shape, a square shape and a trapezoidal shape are included in the quadrangular shape. In FIG. 3 shown as a second embodiment, the projection 22 is formed as a rectangular cross sectional shape. Regardless of the triangular shape and the quadrangular shape, the surface 22d in the atmospheric side is preferably set within an angular range which is perpendicular to the shaft (θ1<90 degrees) or perpendicular to the atmospheric side inclined surface 14 (θ1=90 degrees) since the dust can be easily dammed. θ1 may be larger than 90 degrees (θ1>90 degrees).

Figure 4A:
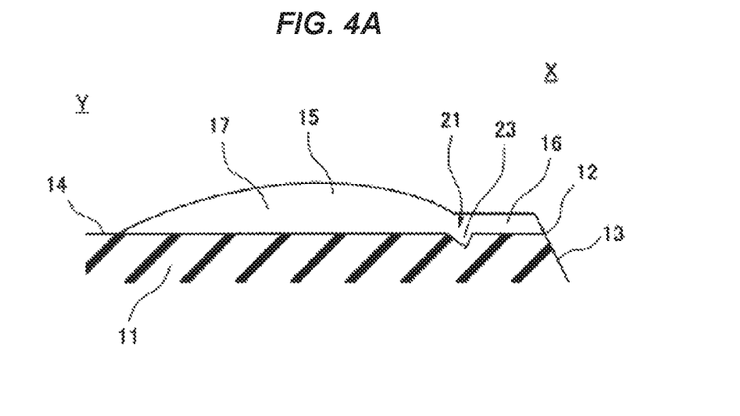
FIG. 4A is an explanatory view of a screw and a three-dimensional shape in the sealing device.
Figure 4B:
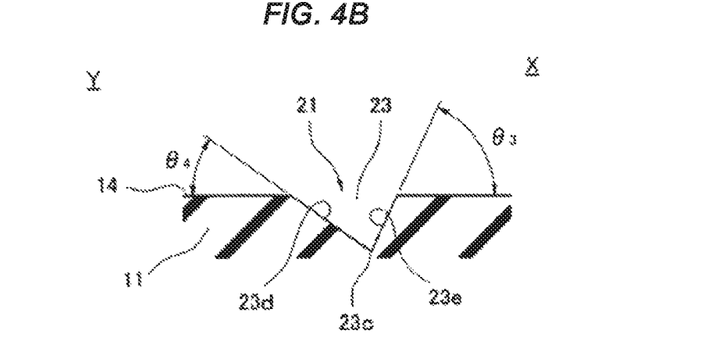
FIG. 4B is an explanatory view of the three-dimensional shape.

(ii) In the first embodiment, the three-dimensional shape 21 is constructed by the projection 22, however, the three-dimensional shape 21 may be alternatively constructed by a groove. In FIG. 4 shown as a third embodiment, the three-dimensional shape 21 is formed as a linear groove 23 which extends in a parallel direction to the lip end 12, that is, in a circumferential direction, and the groove 23 is connected its both end portions (not shown) in a longitudinal direction to the connection portion between the parallel screw 16 and the bilge-shaped screw 17 in the screw 15. A cross sectional shape of the groove 23 is not particularly limited, however, is formed approximately as a triangular cross sectional shape in the embodiment. The triangle is formed as a scalene triangular shape in which its bottom point 23c is closer to the lip end side, and an angle of dip θ3 of a surface 23e in the lip end side is set to be larger than an angle of dip θ4 of a surface 23d in the atmospheric side (θ3>θ4). The groove 23 may be formed approximately as a quadrangular cross sectional shape. Regardless of the triangular shape and the quadrangular shape, the surface 23e in the lip end side is preferably set within an angular range which is perpendicular to the shaft (θ3<90 degrees) or perpendicular to the atmospheric side inclined surface 14 (θ3=90 degrees) since the dust can be easily dammed. θ3 may be larger than 90 degrees (θ3>90 degrees).

(iii) In the first embodiment mentioned above, the projection 22 of the three-dimensional shape 21 is provided at one position between the screws 15, however, the projection or the groove of the three-dimensional shape 21 may be alternatively provided over a plurality of positions between the screws 15.

Figure 5:
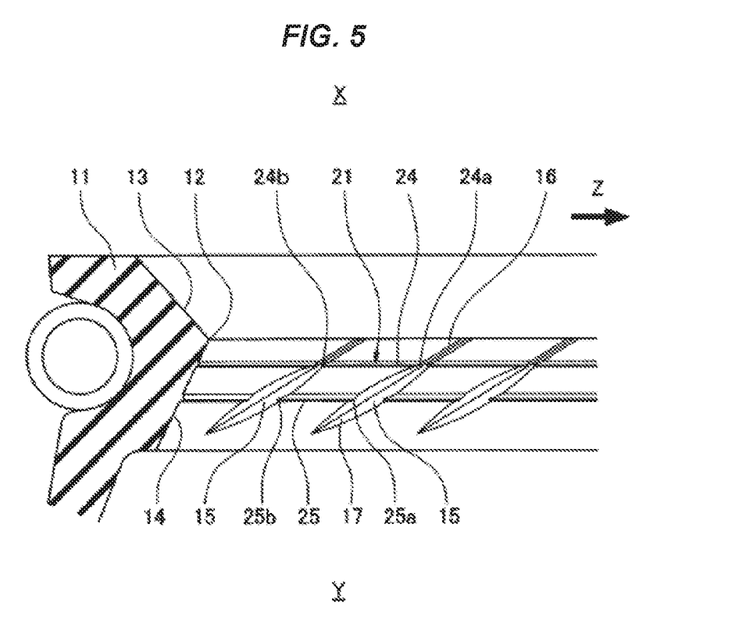
FIG. 5 is a cross sectional view of a substantial part of a sealing device according to a fourth embodiment of the present invention.
Figure 6A:
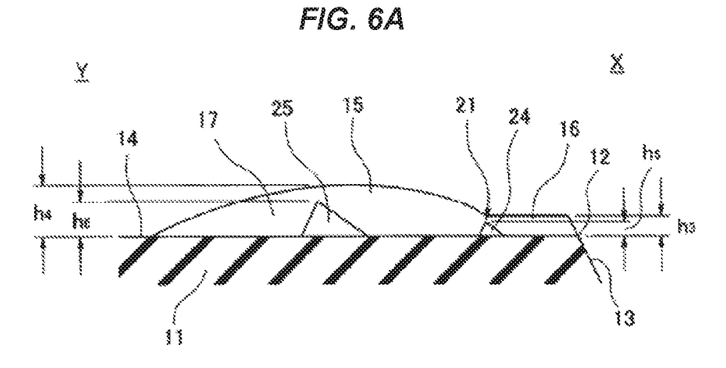
FIG. 6A is an explanatory view of a screw and a three-dimensional shape in the sealing device.
Figure 6B:
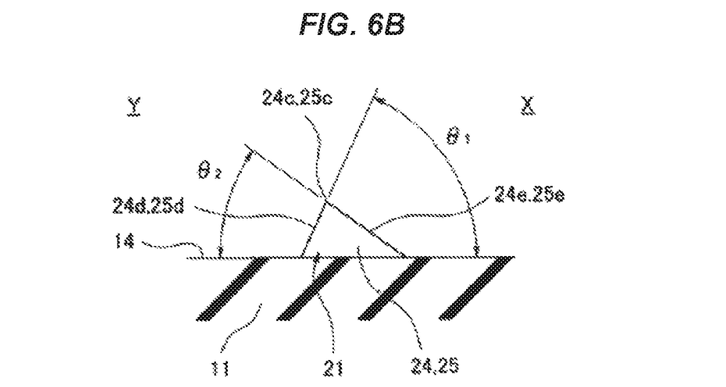
FIG. 6B is an explanatory view of the three-dimensional shape.

In FIGS. 5 and 6 shown as a fourth embodiment, the three-dimensional shape 21 is formed by a combination of a first three-dimensional shaped projection 24 which is provided so as to be connected to the connection portion between the parallel screw 16 and the bilge-shaped screw 17 in the screw 15, and a second three-dimensional shaped projection 25 which is provided so as to be connected to the bilge-shaped screw 17. The first three-dimensional shaped projection 24 is arranged in a lip end side of the second three-dimensional shaped projection 25, the second three-dimensional shaped projection 25 is arranged in the atmospheric side Y of the first three-dimensional shaped projection 24, and both the projections 24 and 25 are arranged so as to be spaced in an axial direction. Both end portions 24a and 24b in a longitudinal direction of the first three-dimensional shaped projection 24 are connected to the connection portion between the parallel screw 16 and the bilge-shaped screw 17. Both end portions 25a and 25b in a longitudinal direction of the second three-dimensional shaped projection 25 are connected to the bilge-shaped screw 17. The projections 24 and 25 are both formed approximately as a triangular cross sectional shape, the triangle is formed as a scalene triangular shape in which its apexes 24c and 25c are closer to the atmospheric side Y, and an elevation angle θ1 of the surfaces 24d and 25a in the atmospheric side is set to be larger than an elevation angle θ2 of the surfaces 24e and 25e in the lip end side (θ1>θ2).

Further, a relationship h5<h≤h6<h4 is satisfied, in which h3 is the height of the parallel screw 16, h4 is the maximum height of the bilge-shaped screw 17, h5 is the height of the first three-dimensional shaped projection 24, and h6 is the height of the second three-dimensional shaped projection 25.

Further, in the fourth embodiment, since the projections 24 and 25 of the three-dimensional shape 21 are provided over a plurality of positions between the screws 15, an effect of suppressing the dust intrusion is high. Further, since the height h5 of the first three-dimensional shaped projection 24 is set to be smaller than the height h3 of the parallel screw 16 provided at the corresponding position, and the height h6 of the second three-dimensional shaped projection 25 is set to be smaller than the maximum height h4 of the bilge-shaped screw 17 provided at the corresponding position, none of the projections 24 and 25 inhibits the pumping action by the screw 15. Therefore, even in the case that the projections 24 and 25 for preventing the dust intrusion are provided over a plurality of positions, the pumping action by the screw 15 can be sufficiently exerted.

What is claimed is:

1. A sealing device inhibiting a sealing fluid on an inboard side of the sealing device from leaking to an atmospheric side of the sealing device, comprising:
   a seal lip having a lip end configured to come into contact with a shaft;
   a plurality of screws circumferentially provided on an atmospheric side inclined surface of said seal lip, said screws configured to exert a pumping action in relation to said sealing fluid; and a three-dimensional shape longitudinally extending along said atmospheric side inclined surface so as to inhibit dust on the atmospheric side from intruding toward said lip end, said three dimensional shape bifurcating said atmospheric side inclined surface into a first surface and a second surface, said second surface being co-planar with the first surface, wherein said three-dimensional shape is constructed by a projection or a groove, wherein said projection is formed approximately as a triangular shape having an apex coming close to the atmospheric side in cross section, and wherein said groove is formed approximately as a triangular shape having a bottom point coming close to a lip end side in cross section.

2. A sealing device inhibiting a sealing fluid on an inboard side of the sealing device from leaking to an atmospheric side of the sealing device, comprising:

a seal lip having a lip end configured to come into contact with a shaft;

a plurality of screws circumferentially provided on an atmospheric side inclined surface of said seal lip, said screws configured to exert a pumping action in relation to said sealing fluid; and a three-dimensional shape longitudinally extending along said atmospheric side inclined surface so as to inhibit dust on the atmospheric side from intruding toward said lip end, said three dimensional shape bifurcating said atmospheric side inclined surface into a first surface and a second surface, said second surface being co-planar with the first surface, wherein said three-dimensional shape is constructed by a projection or a groove, wherein said projection is formed approximately as a triangular shape or a quadrangular shape in its cross section, and a surface in the atmospheric side of said projection is set to an angular range which is perpendicular to said shaft or perpendicular to said atmospheric side inclined surface, and wherein said groove is formed approximately as a triangular shape or a quadrangular shape in cross section, and a surface in the lip end side of said groove is set to an angular range which is perpendicular to said shaft or perpendicular to said atmospheric side inclined surface.

3. The sealing device according to claim 1, wherein each of said screws is constructed by a parallel screw which is provided in the vicinity of said lip end and is uniform in its cross section, and a bilge-shaped screw which is provided continuously from said parallel screw, wherein said three-dimensional shape is constructed by a first three-dimensional shaped projection which is provided so as to be connected to a connection portion between said parallel screw and the bilge-shaped screw or said parallel screw, and a second three-dimensional shaped projection which is provided continuously in said bilge-shaped screw, and wherein a relationship $h5<h3 \leq h6<h4$ is satisfied, in which $h3$ is a height of said parallel screw, $h4$ is a maximum height of said bilge-shaped screw, $h5$ is a height of said first three-dimensional shaped projection, and $h6$ is a height of said second three-dimensional shaped projection.

4. The sealing device according to claim 2, wherein each of said screws is constructed by a parallel screw which is provided in the vicinity of said lip end and is uniform in its cross section, and a bilge-shaped screw which is provided continuously from said parallel screw, wherein said three-dimensional shape is constructed by a first three-dimensional shaped projection which is provided so as to be connected to a connection portion between said parallel screw and the bilge-shaped screw or said parallel screw, and a second three-dimensional shaped projection which is provided continuously in said bilge-shaped screw, and wherein a relationship $h5<h3\ h6<h4$ is satisfied, in which $h3$ is a height of said parallel screw, $h4$ is a maximum height of said bilge-shaped screw, $h5$ is a height of said first three-dimensional shaped projection, and $h6$ is a height of said second three-dimensional shaped projection.

* * * * *